United States Patent
McCaslin et al.

(10) Patent No.: US 8,970,068 B2
(45) Date of Patent: Mar. 3, 2015

(54) PSEUDO-RANDOM BIT SEQUENCE GENERATION FOR MAXIMUM POWER POINT TRACKING IN PHOTOVOLTAIC ARRAYS

(75) Inventors: Shawn R. McCaslin, Austin, TX (US); Bertrand J. Williams, Austin, TX (US)

(73) Assignee: Draker, Inc., Austin, TX (US)

( * ) Notice: Subject to any disclaimer, the term of this patent is extended or adjusted under 35 U.S.C. 154(b) by 606 days.

(21) Appl. No.: 13/359,695

(22) Filed: Jan. 27, 2012

(65) Prior Publication Data

US 2012/0205973 A1 Aug. 16, 2012

Related U.S. Application Data

(60) Provisional application No. 61/441,585, filed on Feb. 10, 2011.

(51) Int. Cl.
*H02J 3/00* (2006.01)
*H02J 3/38* (2006.01)

(52) U.S. Cl.
CPC ............... *H02J 3/385* (2013.01); *Y02E 10/58* (2013.01); *Y10S 323/906* (2013.01)
USPC ............................................. 307/82; 323/906

(58) Field of Classification Search
CPC ................................. Y02E 10/58; H02J 3/385
USPC .................... 320/101; 307/45, 82; 323/906
See application file for complete search history.

(56) References Cited

U.S. PATENT DOCUMENTS

| | | | |
|---|---|---|---|
| 5,867,011 A | 2/1999 | Jo et al. |
| 6,844,739 B2 | 1/2005 | Kasai et al. |
| 7,148,650 B1 | 12/2006 | McNulty et al. |
| 7,158,395 B2 | 1/2007 | Deng et al. |

(Continued)

OTHER PUBLICATIONS

"Maximum power point tracker," Wikipedia, the free encyclopedia, http://en.wikipedia.org/wiki/Maximum_power_point_tracker, 2 pages [Retrieved Nov. 17, 2008].

(Continued)

*Primary Examiner* — Richard V Muralidar
(74) *Attorney, Agent, or Firm* — Meyertons Hood Kivlin Kowert & Goetzel, P.C.; Jeffrey C. Hood

(57) ABSTRACT

A converter unit configured to couple to a photovoltaic panel (PV) may include a controller to sense an input voltage and input current obtained from the photovoltaic panel, and manage the output voltage of a corresponding power converter coupled to a DC bus to regulate the resultant bus voltage to a point that reduces overall system losses, and removes non-idealities when the panels are series connected. The controller may also perform input voltage management and regulation, including maximum power point tracking (MPPT) for the PV. The controller may probe the bus voltage using a probe waveform generated according to a pseudo-random bit sequence (PRBS), to provide a probe signal that is distinct from the control steps performed by the controller. A PV array may feature a respective converter unit coupled to each PV, with each respective controller using a different and unique seed for generating its PRBS.

36 Claims, 7 Drawing Sheets

(56) References Cited

U.S. PATENT DOCUMENTS

| | | |
|---|---|---|
| 7,256,566 B2 | 8/2007 | Bhavaraju et al. |
| 7,564,013 B2 | 7/2009 | Leonhardt et al. |
| 7,940,032 B2 | 5/2011 | Kim et al. |
| 7,960,863 B2 | 6/2011 | Fife et al. |
| 7,969,133 B2 | 6/2011 | Zhang et al. |
| 7,986,122 B2 | 7/2011 | Fornage et al. |
| 7,986,539 B2 | 7/2011 | Fornage |
| 8,854,004 B2 * | 10/2014 | Lee ............... 320/128 |
| 2012/0004874 A1 | 1/2012 | Yin et al. |
| 2012/0101645 A1 * | 4/2012 | Jun et al. ............ 700/287 |

OTHER PUBLICATIONS

Yan Hong Lim and D.C. Hamill, "Simple maximum power point tracker for photovoltaic arrays," Electronic Letters, vol. 36, No. 11, May 25, 2000, 2 pages.

W. Stephen Woodward, "Maximum-Power-Point-Tracking Solar Battery Charger," Electronic Design, Sep. 14, 1998, pp. 114-118.

* cited by examiner

```
param voltage Vprobe;    // amplitude of probe waveform
param voltage Vstep;     // incremental up/down voltage adjustment voltage Vmpp;       // steady-state source voltage power Phi, Plo;     // source power levels at 2 probe points
power Pdiff;        // differential power bool PositiveWave;  // Random bit loop forever {
   // Randomly select the polarity of the waveform
   PositiveWave = PseudoRandomBit();

// Probe both high and low voltage points
   if (PositiveWave) {
      // First half of probe cycle
      change source voltage to (Vmpp + Vprobe);
      measure power Phi;

// Second half of probe cycle
      change source voltage to (Vmpp);
      measure power Plo;

} else {
      // First half of probe cycle
      change source voltage to (Vmpp);
      measure power Plo;

// Second half of probe cycle
      change source voltage to (Vmpp + Vprobe);
      measure power Phi;
   }

// Compute differential power
   pDiff = Phi - Plo;
   if (Pdiff > 0) {
      // Power is greater at higher voltage
      set Vmpp = Vmpp + Vstep;
   } else {
      // Power is greater at lower voltage
      set Vmpp = Vmpp - Vstep;
   }

// Move the computed max power point
   change source voltage to Vmpp;

… # PSEUDO-RANDOM BIT SEQUENCE GENERATION FOR MAXIMUM POWER POINT TRACKING IN PHOTOVOLTAIC ARRAYS

PRIORITY CLAIM AND INCORPORATION BY REFERENCE

This application claims benefit of priority of U.S. Provisional Application Ser. No. 61/441,585 titled "Regulation of Inverter DC Input Voltage, Pseudo Random Bit Sequence Generation for MPPT, and Dynamic Frequency and PWM of Dual-Mode Switching Power Controllers in Photovoltaic Arrays", filed Feb. 10, 2011, and whose inventors are Shawn R. McCaslin, Sam B. Sandbote, and Bertrand J. Williams, and which is hereby incorporated by reference in its entirety as though fully and completely set forth herein.

BACKGROUND OF THE INVENTION

1. Field of the Invention

This invention relates generally to the field of photovoltaic arrays, and more particularly to performing maximum power point tracking on the photovoltaic arrays using pseudo random bit sequences.

2. Description of the Related Art

Photovoltaic (PV) arrays (more commonly known and referred to as solar arrays) are a linked collection of photovoltaic, or solar panels, which typically consist of multiple interconnected solar cells. The modularity of solar panels facilitates the configuration of solar (panel) arrays to supply current to a wide variety of different loads. The solar cells convert solar energy into direct current electricity via the photovoltaic effect, in which electrons in the solar cells are transferred between different bands (i.e. from the valence to conduction bands) within the material of the solar cell upon exposure to radiation of sufficient energy, resulting in the buildup of a voltage between two electrodes. The power produced by a single solar panel is rarely sufficient to meet the most common power requirements (e.g. in a home or business setting), which is why the panels are linked together to form an array. Most solar arrays use an inverter to convert the DC power produced by the linked panels into alternating current that can be used to power lights, motors, and other loads.

The various designs proposed and developed for solar arrays typically fall into one of two configurations: a low-voltage configuration (when the required nominal voltage is not that high), and a high-voltage configuration (when a high nominal voltage is required). The first configuration features arrays in which the solar panels are parallel-connected. The second configuration features solar panels first connected in series to obtain the desired high DC voltage, with the individual strings of series-connected panels connected in parallel to allow the system to produce more current. Various problems have been associated with both configurations, with the most prolific array configuration being the high-voltage series-string based configuration. The series-string configuration raises the overall distribution DC-bus voltage level to reduce resistive losses. However, in doing so it increases panel mismatch losses by virtue of the series-string being limited by the weakest panel in the string. In addition, the resultant DC-bus voltage has a significant temperature and load variance that makes inversion from DC to AC more difficult. Consequently, many design efforts have been concentrated on improving the efficiency of the collection of electrical power from the array, by mitigating these non-idealities.

Various designs have been proposed and developed for DC/DC (DC-to-DC) converter systems applied to solar arrays. Most of these designs have concentrated on the implementation of Maximum Power Point Tracking (MPPT), which employs a high efficiency DC/DC converter that presents an optimal electrical load to a solar panel or array, and produces a voltage suitable for the powered load. Most DC-DC architectures used for PV optimizers do not feature significant small-signal isolation between power inputs and outputs. A signal introduced on an optimizer's input appears at its output. Likewise, a signal introduced on an optimizer's output appears at its input. As it passes from input to output or output to input, this signal may be attenuated, or in some cases, it may be amplified. This poses a particular problem for optimizers that perform MPPT simultaneously within the same array. A probe signal intentionally injected on any first optimizer's input for the purposes of local MPPT unintentionally appears at its output, with consequences for a second optimizer connected in series or parallel.

Many other problems and disadvantages of the prior art will become apparent to one skilled in the art after comparing such prior art with the present invention as described herein.

SUMMARY OF THE INVENTION

In one set of embodiments, a power converter may couple to a solar panel to derive an input voltage and input current from the solar panel, in order to provide an output voltage and an output current to a DC voltage bus. The power converter may include a control module having input ports, each input port receiving a different one of a set of parameters that include a first parameter indicative of the input current of the power converter provided by the solar panel, a second parameter indicative of the input voltage of the power converter provided by the solar panel, a third parameter indicative of the output voltage of the power converter, and a fourth parameter indicative of the output current of the power converter. The control module may also include a controller executing a maximum power point tracking (MPPT) algorithm to regulate the input voltage and the input current of the power converter according to the first, second, third, and fourth parameters. When executing the MPPT algorithm, the controller may generate a probe waveform based on a pseudo random bit sequence (PRBS) input, and use the generated probe waveform to probe an overall voltage on the DC voltage bus. In some embodiments, Manchester-encoding may be used to generate the probe waveform from the PRBS in order to obtain a DC-balanced probe waveform.

The probe waveform may be a seamless succession of multiple instances of at least two distinct fundamental wave patterns. In one embodiment, a first fundamental wave pattern represents one of binary input values '0' and '1', and begins with a low value and ends with a high value, and a second fundamental wave pattern represents the other binary input value of the binary input values '0' and '1', and begins with a high value and ends with a low value. The control module may derive the PRBS from a unique identification code corresponding to the control module. In other words, the control module may generate the PRBS input from a unique seed different from similar seeds used by other similar control modules used for controlling other similar power converters (coupled to other respective solar panels) that provide a respective output voltage and a respective output current to the DC voltage bus.

A method for controlling a power converter coupled to a solar panel to provide an output voltage and an output current to a voltage bus may include monitoring the input voltage and input current of the power converter, monitoring the output voltage and the output current of the power converter, and regulating the input voltage of the power converter according to an MPPT algorithm using parameters corresponding to the monitored input voltage and monitored input current of the power converter and the monitored output voltage and output current of the power converter. The regulating of the input voltage of the power converter according to the MPPT algorithm may include generating a probe waveform according to a PRBS, and probing an overall bus voltage of the voltage bus using the probe waveform. The PRBS may be generated from a unique seed value corresponding to the power converter, and may be generated using a primitive polynomial bit generator, with a periodicity of the PRBS determined by a number of bits in the primitive polynomial of the primitive polynomial bit generator.

When probing the overall bus voltage, if a bit in the PRBS has a first bit value (e.g. '1'), the first half of the probe cycle may involve obtaining a value of a first output power of the power converter for a first value of the input voltage corresponding to a target value augmented by an amplitude of the probe waveform, and the second half of the probe cycle may involve obtaining a value of a second output power of the power converter for a second value of the input voltage corresponding the target value. If a bit in the PRBS has a second bit value (e.g. '0'), the first half of the probe cycle may involve obtaining the value of the second output power for the second value of the input voltage, and the second half of the probe cycle may involve obtaining the value of the first output power for the first value of the input voltage. The target value may be adjusted according to the value of the first output power and the value of the second output power, and the input voltage of the power converter may then be adjusted (regulated to) according to the new (adjusted) target value. In one embodiment, this may include increasing the target value by a specified amount, and regulating the input voltage of the power converter to the increased target value if the value of the first output power is greater than the value of the second output power, and decreasing the target value by a specified amount, and regulating the input voltage of the power converter to the decreased target value if the value of the second output power is greater than the value of the first output power.

In some embodiments, a converter unit may include a power converter having an input to couple to a solar panel to obtain an input voltage and input current from the solar panel, and an output to couple to a voltage bus to provide a converter output voltage and a converter output current to the voltage bus. The converter unit may also include a control unit having input ports, with input port receiving one of a set of parameters that include a first parameter indicative of an input current of the power converter, a second parameter indicative of an input voltage of the power converter, a third parameter indicative of the converter output voltage, and a fourth parameter indicative of the converter output current. The control unit may regulate the input voltage of the power converter according to an MPPT algorithm that uses the first, second, third, and fourth parameters as input values, and uses a probe waveform generated according to a PRBS, to probe an overall voltage on the voltage bus. The probe waveform may be a Manchester encoded waveform based on the PRBS.

The control unit may include a pseudo-random sequence generator (PRSG) to generate the PRBS, an encoding unit to receive the PRBS and generate the probe waveform based on the received PRBS, and a modulating unit to generate a converter control signal according to at least the probe waveform, and provide the converter control signal to the power converter to regulate the input voltage of the power converter. The control unit may also include an MPPT controller to generate a feedback control signal based on the first, second, third, and fourth parameters, and the modulating unit may generate the converter control signal according to a combination of the feedback control signal and the probe waveform. In one embodiment, the modulating unit generates the probe waveform as a Manchester-encoded waveform. The power converter may be a switching power converter, in which case the converter control signal may be a pulse width-modulated signal provided as the switching signal to the power converter.

A system for harnessing photonic energy to provide power to one or more loads may include multiple solar panels, each solar panel providing a respective output current and a respective output voltage. The system may further include a DC voltage bus providing a DC bus voltage, and multiple converter units coupled to the DC voltage bus, each converter unit providing a respective converter output voltage to the DC voltage bus, with each solar panel coupled to a different respective (corresponding) converter unit to provide its respective output current and its respective output voltage as inputs to its corresponding converter unit. Each corresponding converter unit may include a switching power module that produces a respective converter output voltage and respective converter output current, and each corresponding converter unit may regulate an input voltage of its switching power module according to an MPPT algorithm receiving various parameters as inputs, and employing a probe waveform based on a respective PRBS to probe the DC voltage bus. The parameters may correspond to the input voltage and input current of the switching power module and the respective converter output voltage, and the respective converter output current.

The converter units may be series connected to the DC voltage bus via their respective outputs, and each corresponding converter unit may generate its respective PRBS based on a unique seed that is different from similar unique seeds of all other converter units. Each corresponding converter unit may derive its unique seed from identification information corresponding to the corresponding converter unit, and each corresponding converter unit may generate its probe waveform as a Manchester encoded waveform according to its respective PRBS.

BRIEF DESCRIPTION OF THE DRAWINGS

The foregoing, as well as other objects, features, and advantages of this invention may be more completely understood by reference to the following detailed description when read together with the accompanying drawings in which:

FIG. 10 shows one embodiment of an algorithmic description of the Manchester encoded waveform shown in FIG. 9;

Figure 1:
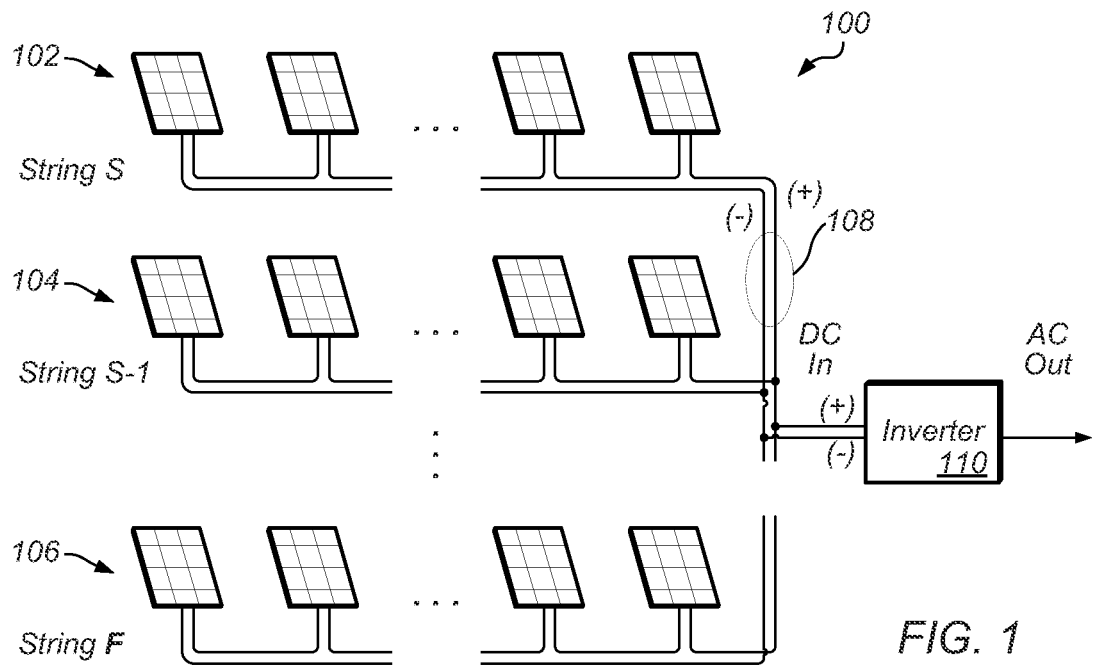
FIG. 1 shows an example diagram of a conventional series-string and parallel branch solar array configuration.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

In solar array systems, many non-idealities may be mitigated by utilizing distributed Maximum Power Point Tracking (MPPT). Distributed MPPT usually includes insertion of a DC/DC converter or a similar power converter behind solar panels in the array, most commonly behind each and every solar panel in the array, to adapt the coupled solar panel's power transfer onto a high-voltage bus (typically a high-voltage DC bus) which connects the panels together via the DC/DC converters. A typical solar array 100 is shown in FIG. 1. Solar panel series-strings 102, 104, and 106 are coupled in parallel to bus 108, which may be a DC/DC bus. Each solar panel series-string includes solar panels coupled in series to a respective bus, each of those respective buses coupling to bus 108 as shown to obtain parallel-coupled solar panel series-strings. An inverter 110 is coupled to bus 108 to ultimately drive a connected load, which may be coupled to the output of inverter 110.

Figure 3:
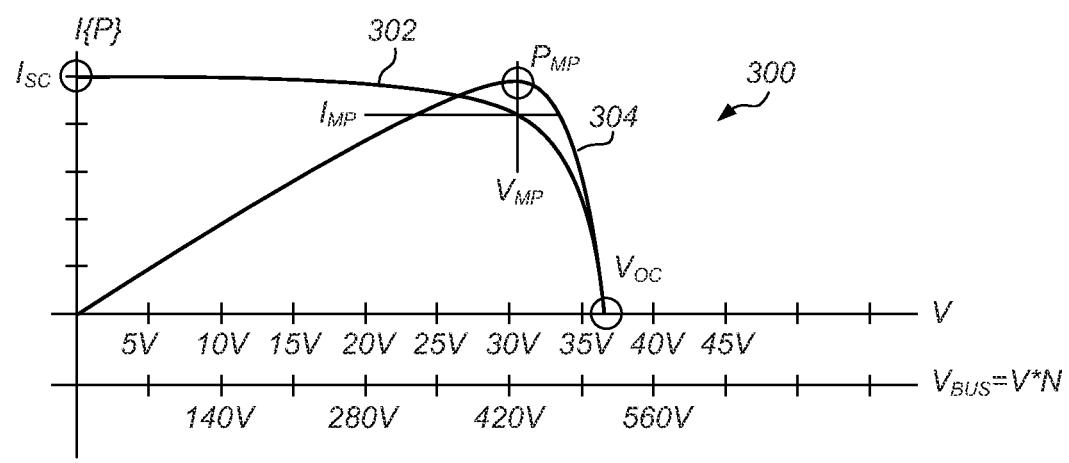
FIG. 3 shows an example V/I power curve for a series-string solar array configuration.

An example of the V/I (voltage/current) characteristic for each solar panel is shown in FIG. 3. As seen in FIG. 3, the V/I characteristic may be modeled as a current source in parallel with a multiplied shunt diode, where the current is proportional to the solar insolation levels, and the shunt diode is the result of the solar cell diode in each cell multiplied by the number of cells in series which make up that solar panel. Curve 302 represents the V/I curve, that is, the current I output by the solar panel (represented on the vertical axis) for a given output voltage V (represented on the horizontal axis). Curve 304 represents the power curve associated with V/I curve 302, showing the maximum power point $P_{MP}$, that is, the point at which the product of the current and voltage output by the solar panel is at its maximum. These values are indicated as $I_{MP}$ and $V_{MP}$, respectively, and $I_{MP}*V_{MP}=P_{MP}$. $V_{OC}$ indicates the open circuit voltage output by the solar panel, that is, the voltage output by the solar panel when not providing current to a load. Similarly, $I_{SC}$ indicates the short circuit current output by the solar panel, that is, the current output by the solar panel with its output terminals shorted together. $V_{BUS}$ indicates the total voltage that appears on the bus for N solar panels connected in the series-string.

Figure 4:
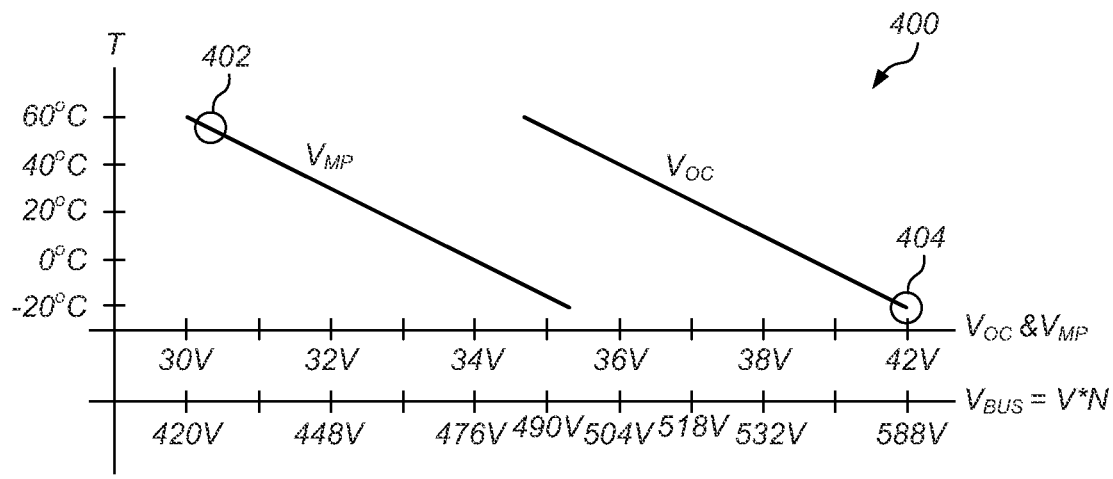
FIG. 4 shows an example $V_{OC}$ & $V_{MP}$ vs. temperature curve for a typical solar panel.

Turning now to FIG. 4, the open circuit voltage $V_{OC}$ of the solar panel may be set by the current—generated as a result of solar insolation—shunted by the series multiplied diode elements. As determined by the shunt diodes within the cell, this voltage may exhibit temperature variance similar to a silicon diode junction. The $V_{OC}$ for a solar panel may thus increase with decreasing temperature, and vice-versa, as indicated by the $V_{OC}$ curve shown in FIG. 4. Consequently, in order for the maximum bus voltage (maximum $V_{BUS}$) to comply with NEC (National Electrical Code) standards, the number of solar panels that may be connected in series at a given site needs to be determined based on the expected coldest temperature at that site. The bus specification usually limits the maximum value of $V_{BUS}$ to 600V in a US NEC compliant system. It should also be noted that at high temperatures, and while under load, the bus voltage may be substantially lower than the allowed operating level for the Bus. Point 402 on the $V_{MP}$ curve indicates the typical $V_{MP}$ condition, and point 404 on the $V_{OC}$ curve indicates a typical $V_{OC}$ condition.

Use of a properly designed respective adaptive DC/DC converter coupled to each solar panel in a solar panel array allows for modification of the curves shown in FIG. 4, under algorithmic control of the DC/DC converters. In order to calculate how many panels may be placed in series, the following equation may be used:

$$N=\text{Integer}(V_{BUS\text{-}max}/V_{OC\text{-}p}), \tag{1}$$

where $V_{BUS\text{-}max}$ is the maximum value of $V_{BUS}$, e.g. 600V when observing NEC standards, and $V_{OC\text{-}p}$ is the maximum value of $V_{OC}$ for any given panel utilized in the array, at the minimum site location temperature. For example, if $V_{BUS\text{-}max}=600\text{V}$, and $V_{OC\text{-}p}=42\text{V}$:

$$N=\text{Integer}(600\text{V}/42\text{V})=\text{Integer}(14.28)=14. \tag{2}$$

Therefore, 14 panels of this type may normally be placed in series for a cold temperature $V_{BUS\text{-}OC}=\sim14*42\text{V}=588\text{V}$. According to the V/I curve 402, which corresponds to high temperature and operation at the maximum power point, in FIG. 4, $V_{MP}$ at 45° C. is close to 30.5V, resulting in a bus voltage value of $V_{BUS}=\sim14*30.5\text{V}=427\text{V}$ under normal operating conditions for this example.

During normal operation, each panel may therefore contribute ~32V to the total bus voltage for the solar panel array string under. Assuming a case of shading, damage, or extreme mismatch, which may result in a given percentage of the solar panels in each string not providing normal power, the $V_{MP}$ bus voltage level may decrease by the amount that the given percentage of the solar panels fails to provide. For example, 20% of the solar panels in a given series-string failing to function normally may lead to a normal operating voltage of the series-string of $V_{BUS}*\sim80\%=358\text{V}$, which represents a substantial drop. If other series-strings (of solar panels) maintain the bus voltage at $V_{BUS}=448\text{V}$ under normal conditions, the given series-string may produce no power at all, and may come close to act as a shunt diode load on the high-voltage DC bus (e.g. bus 108 shown in FIG. 1).

In this example, to design a DC/DC converter unit to isolate the panel voltage from the Bus voltage to alleviate the problem, the desired operating points may be specified by determining the number of panels, and thus converter modules, to be connected in series. For $V_{BUS-MAX}$ (i.e. maximum bus voltage) conditions, each converter module may be limited to $V_{O-MAX}$=600V/14=42.85V, comparable to the panel $V_{OC}$, that is, $V_{OC-p}$. Furthermore, each module may be operated sufficiently below this level, to ensure that when a specified percentage (e.g. 15%) of the number of the solar panels are dysfunctional, the remaining modules may successfully boost up their voltage, staying below $V_{O-MAX}$, to compensate for lost voltage in that string. In the specific example provided, the preferred output operating voltage for each DC/DC converter module may thus be expressed as:

$$V_{O-nom} \leq (12/14 * 42.85V) \leq 36.7V, \quad (3)$$

and thus, $$V_{BUS} = 36.7V * 14 = 513.8V, \quad (4)$$

normally.

More generally, the nominal output voltage for each solar panel may be determined by dividing the number of functioning panels by the total number of panels in the series-string, and multiplying the result by the maximum output voltage of each solar panel. In this example, the bus voltage at the normal operating point may be improved by 15%, reducing the DC bus losses by ~32%. The resulting system may therefore become tolerant of two panels in each string becoming non-functional, fully or partially, while maintaining power from the other panels. In cases of less than fully non-functional operation, many of the panels may be degraded substantially for the same recovery level.

Figure 2A:
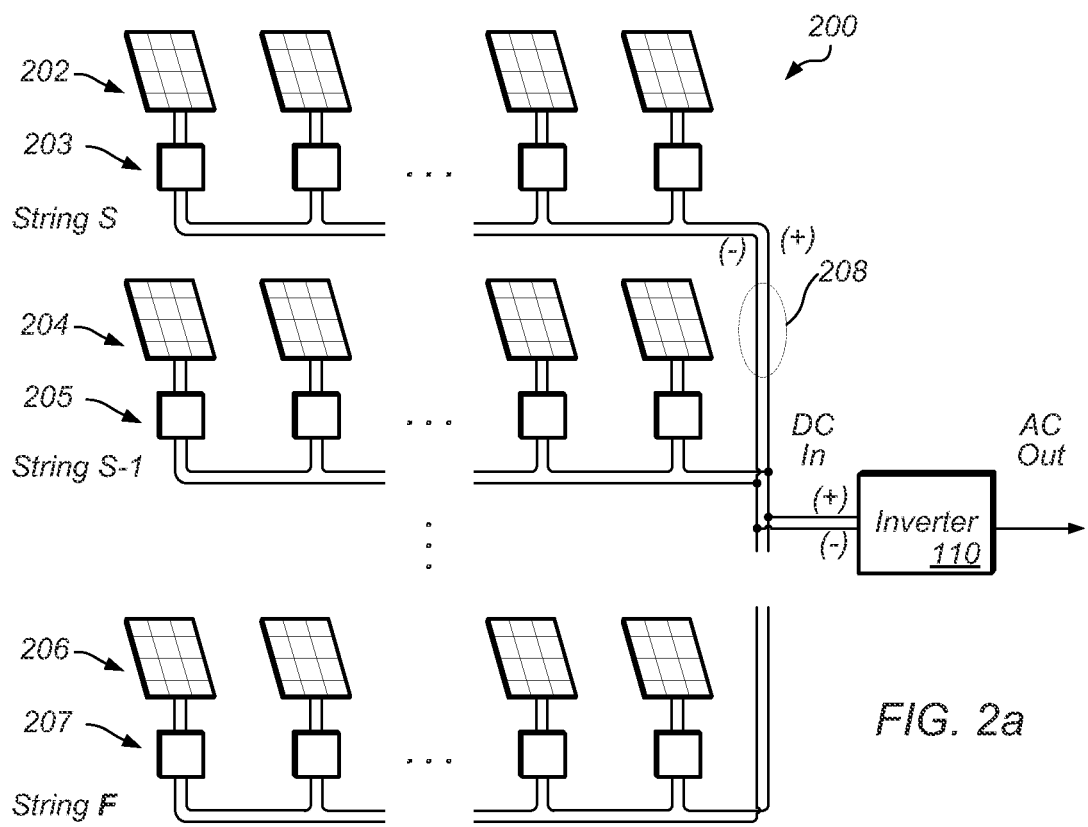
FIG. 2a shows an example of a series-string solar array configuration retrofitted with DC/DC converters attached to the solar panels.
Figure 5:
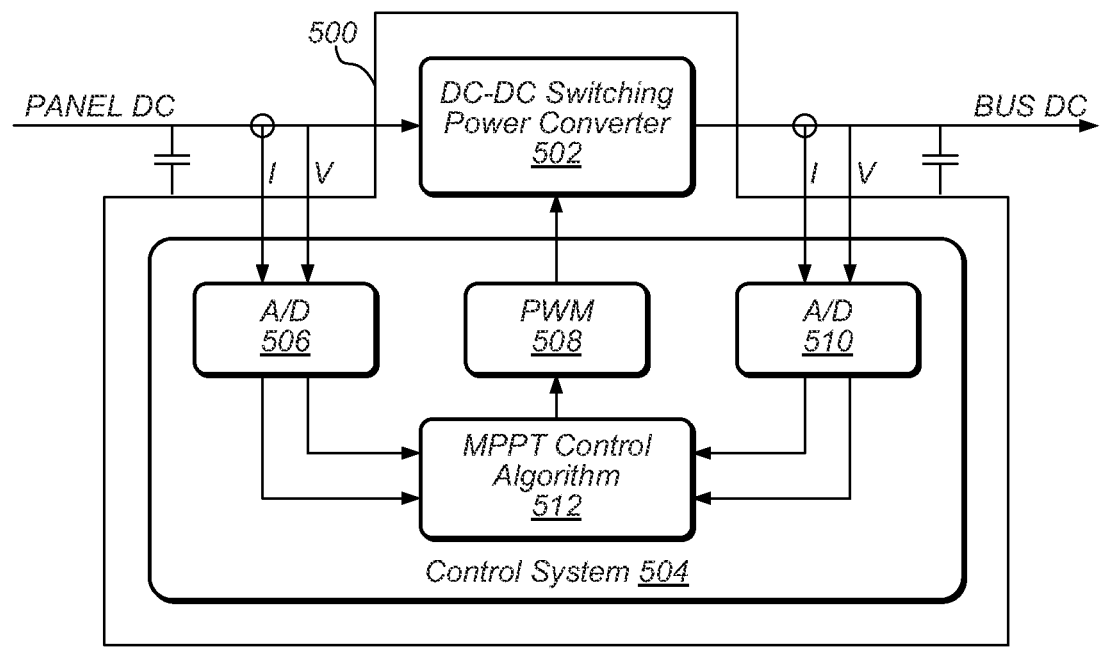
FIG. 5 shows an example Architecture for a direct MPPT controlled DC/DC Converter.

Maximum Power Point Tracking:

FIG. 2a shows one embodiment of a system 200 featuring solar panel series-strings 202, 204, and 206, with each of solar panels 202, 204, and 206 coupled to a respective power converter unit of power converter units 203, 205, and 207, respectively. In this case, power converter units 203, 205, and 207 may each include a control unit and a power converter controlled by the control unit, and providing a voltage for the respective bus to which the given string is coupled, with the buses coupling to bus 208 in parallel as shown. Thus, respective outputs of the power converters and controllers 203 are series coupled to high voltage DC bus for String S, the respective outputs of the power converters and controllers 205 are series coupled to high voltage DC bus for String S-1, and the respective outputs of the power converters and controllers 207 are series coupled to high voltage DC bus for String F, with the three buses parallel coupled to high voltage DC bus 208. Inverter 110 may be coupled to bus 208 in system 200, to drive a connected load(s). For the sake of clarity, each power converter and controller will be referred to herein simply as a "converter unit", with the understanding that each converter unit may include a power converter, e.g. a DC/DC switching converter, and all associated control circuitry/unit, e.g. functional units to perform MPPT. Each of the attached converter units 204 may be designed to execute a control algorithm, which may exercise control over a switching power conversion stage. The internal structure of one embodiment of a typical converter unit 500 is shown in the block diagram of FIG. 5. Converter unit 500 may include a control system 504 implementing a single control loop to perform MPPT control of switching converter 502. The input voltage and input current from the solar panel may be sensed and sampled by A/D converter 506, and the output voltage and output current from switching converter 502 may be sensed and sampled by A/D converter 510. These sampled values may be processed using control algorithm 512 to calculate the power, and the duty-cycle of the switching signal provided to switching converter 502. For example, control algorithm 512 may be implemented in hardware, it may be implemented as instructions executed by a microcontroller/processor, or as a combination of both, and may use the sampled values directly to produce the required PWM signal 508 to achieve the conversion characteristics that maintain the solar panel at its maximum power point. It should also be noted, that analog implementation of control system 504 is possible and contemplated, in which case A/D converters 506 and 510 would not be required.

Figure 2B:
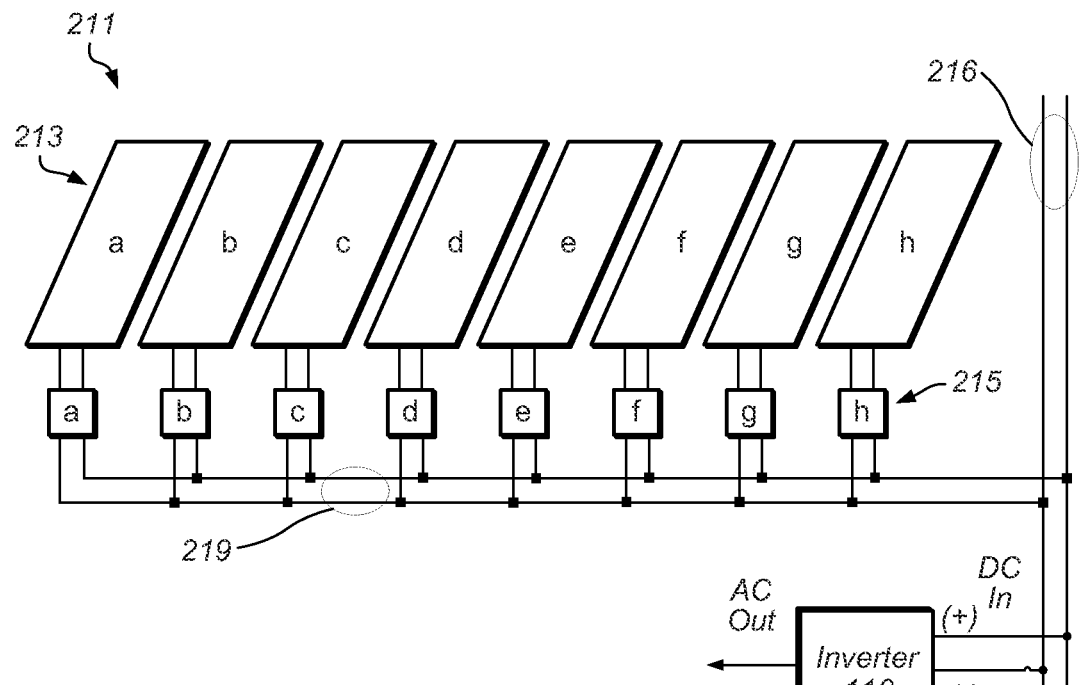
FIG. 2b shows an example of a parallel-string (parallel connected) solar array configuration with DC/DC converters attached to the solar panels.

In alternate embodiments, the respective outputs of the power converters and controllers 204 may be parallel coupled to high voltage DC bus 208, which may be coupled to high voltage DC bus 206. FIG. 2b shows one embodiment of a system 211 featuring a solar panel parallel-string 213, in which each of solar panels 213 a-h is coupled to a respective converter unit 215 a-h. Converter units 215 a-h may also each include a control unit and a power converter providing a voltage for bus 219, and controlled by the control unit. For example, panel 213a is coupled to converter unit 215a, panel 213b is coupled to converter unit 215b, and so on. The respective outputs of the power converters and controllers 215 are then parallel coupled to high voltage DC bus 219, which may be coupled to high voltage DC bus 216. Each of the attached converter units 215 may be designed to execute a control algorithm, which may exercise control over a switching power conversion stage. For a more detailed presentation, please refer to U.S. patent application Ser. No. 12/314,050, fully incorporated herein by reference. Possible embodiments of converter unit 205 are provided in FIG. 5 and FIG. 7. Again, an inverter 110 may be coupled to bus 216 in system 211, to provide AC power to a connected load(s).

Many algorithms currently exist for determining and maintaining MPPT operation in a system such as system 200, including Hill Climbing, Zero Derivative, Fuzzy Logic, etc. While such algorithms are applicable to these systems, each has its own advantages and disadvantages. The choice of algorithm type may be determined by a compromise of dynamic tracking characteristics, precision, and/or tracking bandwidth against desired results. Most algorithms may be considered equivalent of each other and equally applicable to a static system. Dynamic conditions typically occur during variable cloud shading and similar events, where the characteristics of the solar panel connected to the converter unit, as well as all of the other solar panels in the string may be affected rapidly. Under these conditions, converter units, such as converter unit 500 shown in FIG. 5, may not be able to provide a satisfactory response time. In one set of embodiments, a novel converter unit may implement a fast algorithm to track the dynamic conditions, and a slow algorithm to maintain accuracy and precision of the MPPT operating point. In some embodiments, an MPPT algorithm may include a pseudo-random sequence, which may be encoded to provide a DC balance, such that the resulting voltage probe at the input port has improved tracking and dynamic response.

Dual-Loop Fast Tracking MPPT:

Possible responses of the converter unit may be categorized as falling into one of two basic categories: a response to provide accurate MPPT, and a response to meet the needs for fast adaptive tracking. One solution may be derived from the unique characteristics of the solar panel V/I curve during most fast transients. A typical transient under consideration might be a cloud passing over the solar panels, producing a variable insolation level transient.

Figure 6:
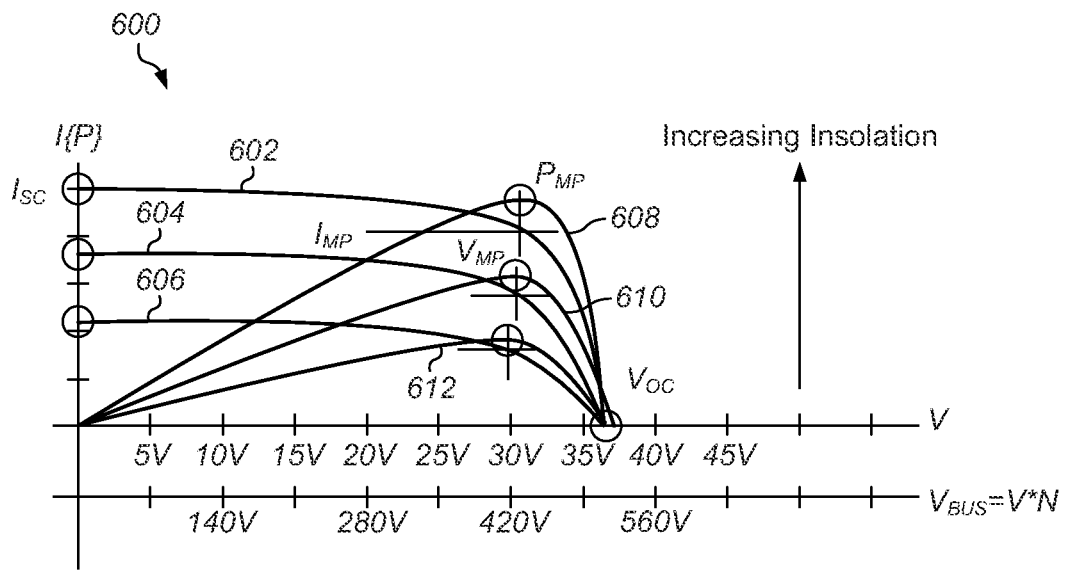
FIG. 6 shows an example V/I Curve for a typical solar panel at different insolation levels.

The graph 600 in FIG. 6 shows V/I curves for a given solar panel under three substantially different insolation levels. V/I curve 602 corresponds to a highest insolation level, V/I curve 604 corresponds to a lower insolation level, and V/I curve 606 corresponds to a lowest insolation level. Power curves 608, 610, and 612 in graph 600 are the power curves corresponding to V/I curves 602-606, respectively. As seen in graph 600, the current I generated by the solar panel is substantially reduced at lower insolation levels. In fact, it is typically the case that the current I is directly proportional to the insolation level. As a result, and as also seen in graph 600, the voltage at which MPPT is achieved remains substantially static, and varies very little over a transient of different insolation levels. In other words, the desired voltage $V_{MP}$ varies minimally, if at all, with respect to changing insolation levels. Consequently, early control systems for solar panels did not include a MPPT mechanism at all, but rather just operated the solar panel at a fixed voltage under all conditions, with the fixed voltage presumed to be near the desired MPPT voltage. However, such systems are not adaptive, and consequently cannot determine what the proper operating voltage for that given panel or string should be. Because of their lack of accuracy, the operation of such systems results in substantially reduced power transfer.

Figure 7:
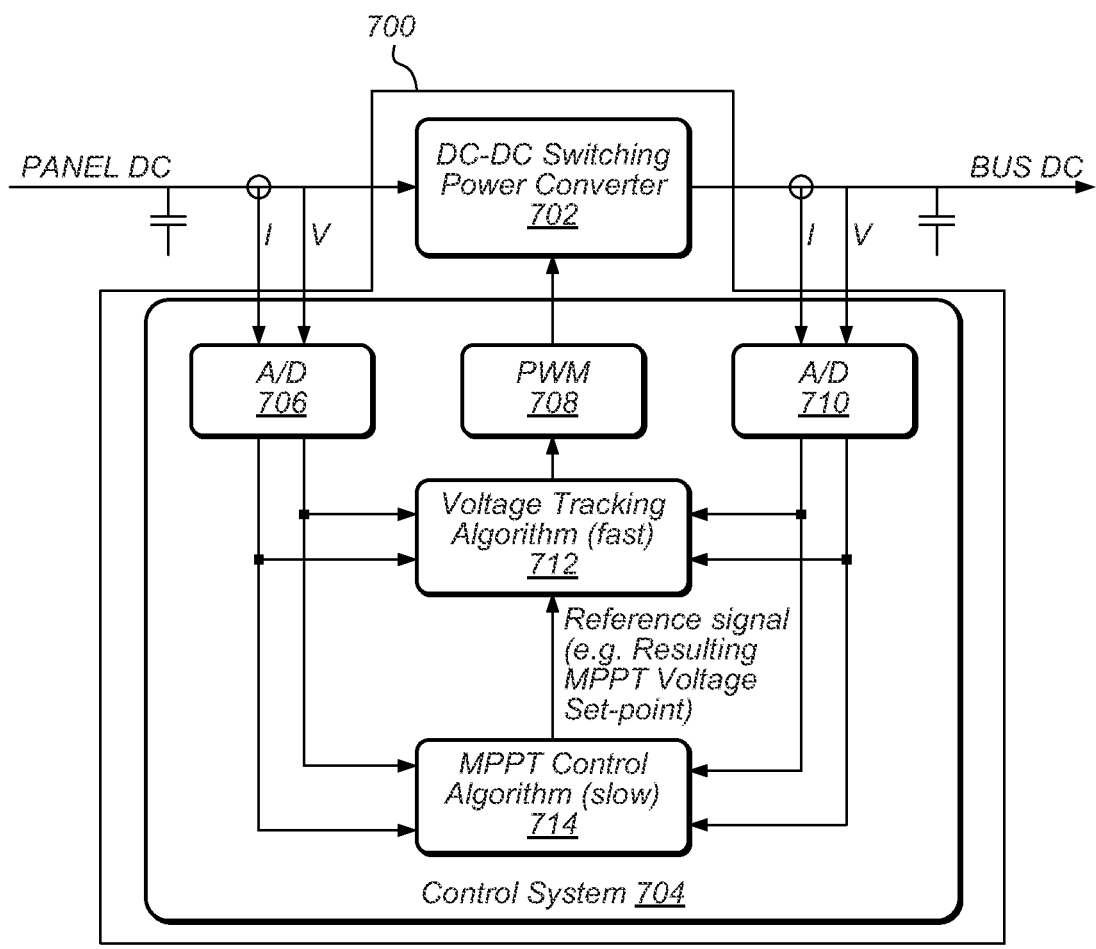
FIG. 7 shows one embodiment of a DC/DC converter controller that features an inner control loop regulating to $V_I$, and an outer MPPT control loop that sets the value for $V_I$.

One embodiment of an improved converter unit and method for achieving a fast response time together with accurate MPPT is shown in FIG. 7. Converter unit 700 may include a fast tracking inner control loop, which may be a fast tracking voltage regulating loop 712, and a slower MPPT tracking loop 714 utilized to set the "Reference" point for the inner control loop 712. In the embodiment shown, the Reference point is the reference voltage for the fast tracking inner control loop 712. The Reference point may be provided by MPPT loop 714 in the form of a control signal, whether analog or digital, to the inner voltage regulating loop 712, to determine what reference point (in this case reference voltage) the control system 704 should regulate to. The inner fast tracking loop 712 may directly control the DC/DC conversion duty-cycle of PWM control signal 708 for switching converter 702, and the outer MPPT loop 714 may continually monitor and average the power conditions to instruct the inner loop 712 what voltage value regulation should be performed to. Again, A/D converter 706 may be used to sense and sample the input voltage and current obtained from the solar panel, and A/D converter 710 may be used to sense and sample the voltage and current output by switching converter 702. However, in case of analog implementations, there is no need for A/D converters 706 and 710. Inner control loop 712 may be designed to monitor one or more of the input-ports (I and V received from the solar panel) and output-ports (I and V received from the output of power converter 702). Accordingly, converter unit 700 may include a total of four input ports, a first pair of input ports to receive input-port voltage and current from the solar panel, and a second pair of input ports to receive output-port voltage and current from power converter 702. It may also include an output port to provide the control signal to power converter 702 via PWM 708.

In one embodiment, fast tracking loop 712 may include a hardware PWM controller generating the PWM control signal 708 using analog and digital hardware functions, for a fully hardware-based control system. In another embodiment, fast tracking loop 712 include a microcontroller based system utilizing A/D and PWM peripherals implementing the fast tracking loop as a combination of hardware and firmware. Choices of embodiments including hardware and/or software implementations or a combination thereof may be based upon cost and performance criteria for the intended system while maintaining equivalence from an architectural perspective disclosed in at least FIG. 7.

MPPT algorithms typically use some form of dithering to determine a derivative of the Power vs. Voltage conditions, or to determine and maintain operation at the maximum power point. In converter unit 700, this dithering may now be performed by control system 704 dithering the reference signal (e.g. the resulting MPPT set-point, which may be an MPPT voltage set-point for regulating the input-port voltage, that is, the voltage input to A/D 706 and into converter 702) to the inner loop 712, rather than by directly modulating the duty-cycle of PWM signal 708. The advantages of the dual-loop structure in converter unit 700 include improved stability of the system, and very fast acquisition and tracking of the system during transients. Other advantages that may also be derived from the architectural partitioning into two control loops include current-mode operation of the inner Vin regulating control system, that is, current-mode operation of the inner control loop 712. Current-mode operation offers several advantages, including excellent tradeoff between stability and tracking speed, over-current protection and limiting, and automatic pulse-skipping during discontinuous-mode operation. Current-mode operation of fast tracking inner loop 712 may be particularly attractive, and easily enabled, when fast tracking inner loop 712 is implemented fully in hardware.

Pseudo Random Bit Sequence (PRBS) Generation for MPPT

Figure 8:
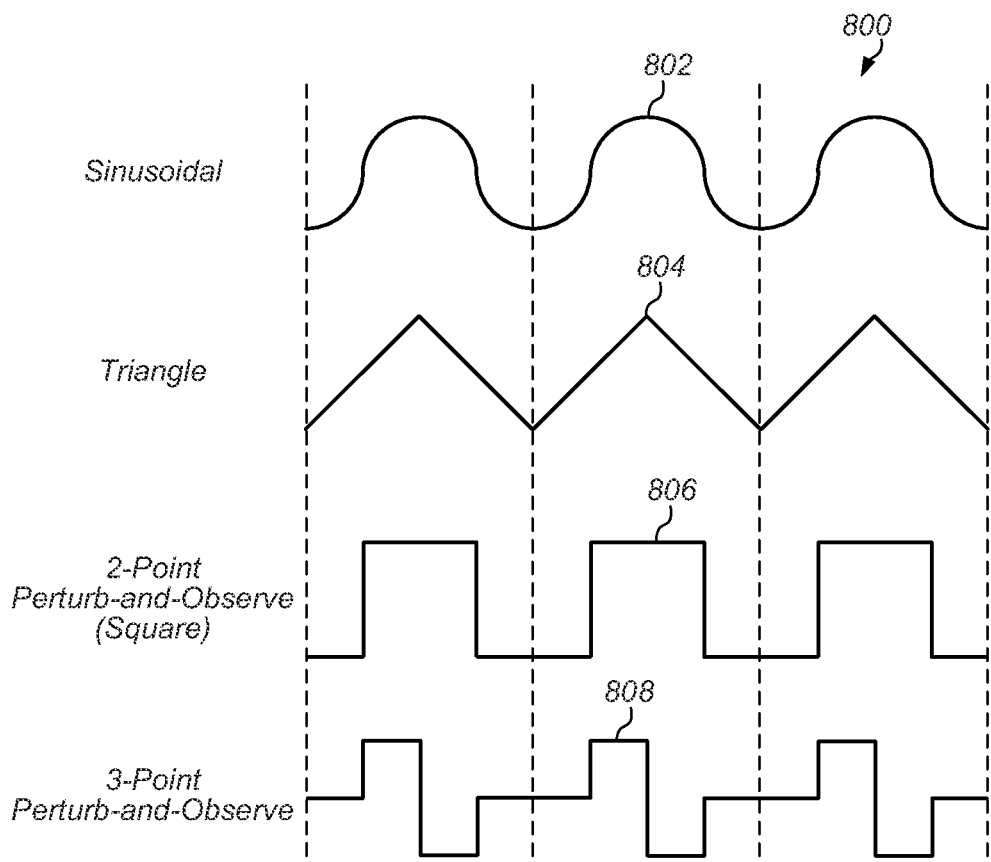
FIG. 8 shows waveform diagrams illustrating various common MPPT probe waveforms.

A generic MPPT algorithm typically involves moving a power source's output voltage up and down (probing) by a small amount ($V_{step}$) relative to its present operating point. The common square wave probe signal consists of repeating cycles of equal time, each divided into two halves. The first half of the cycle may be a low small-signal voltage, and the second half of the cycle may be a high small-signal voltage. If the pattern within a cycle is inverted from a low/high to a high/low waveform, it may simply be interpreted as being 180 degrees out of phase. Power is measured at both the higher and lower voltage levels, and the operating point voltage may be adjusted in the direction of higher power. Numerous variations on this basic scheme include different probe waveforms, different methods for averaging voltage and current measurements over time before computing power, and constraints on the movement of the computed MPP. FIG. 8 shows waveform diagrams illustrating various common MPPT probe waveforms 800 that may be used in various different embodiments executing an MPPT algorithm. The waveforms shown by way of example include sinusoidal waveforms 802, triangle waveforms 804, 2-point perturb-and-observe square waveforms 806, and/or 3-point perturb-and-observe waveforms 808.

As also previously mentioned, MPPT may be distributed throughout the array by means of optimizers, or power converters, placed at the outputs of each panel. The optimizers may be DC-DC converters performing MPPT on their input, which is connected to the PV panel. To form series-strings, the positive output terminal of one optimizer may become the negative (local ground) for the next (see FIG. 2a, for example). To form parallel-strings, the positive output terminal of one optimizer is coupled to the positive output terminal of a next optimizer in the string while the negative output terminal of one optimizer is coupled to the negative output terminal of a next optimizer (see FIG. 2b, for example).

Most DC-DC architectures used for PV optimizers do not feature significant small-signal isolation between power inputs and outputs. A signal introduced on an optimizer's input appears at its output. Likewise, a signal introduced on an optimizer's output appears at its input. As it passes from input to output or output to input, this signal may be attenuated, or in some cases, it may be amplified. This poses a particular problem for optimizers that perform MPPT simultaneously within the same array. A probe signal intentionally injected on any first optimizer's input for the purposes of local MPPT unintentionally appears at its output, with consequences for a second optimizer connected in series or parallel. The undesired signal is passed through the second optimizer from output to its input. This second optimizer also performs local MPPT on its input by injecting a probe signal, but also sees the unintentionally introduced probe signal from the first. The effect on the input voltage is an additive perturbation. During execution of the second optimizer's MPPT algorithm, this unintentionally perturbed probe signal may cause errors in the power difference calculation leading to an unstable or fluctuating input power point. The input power point may only be optimal over the long-term average, and may result in wasted power. This issue is typically not unidirectional from a first optimizer to a second. In general, it is expected for an optimizer executing an MPPT algorithm at its input to be affected by signals coupled from all other optimizers in the entire array.

In one set of embodiments, a Manchester-encoded waveform may be used to perform the probing on the DC voltage bus for MPPT. The Manchester-encoded probe waveform may be considered the equivalent of a square wave probe in which the pattern of low and high values within the two halves of a single cycle is modulated according to a binary input value. A Manchester cycle representing the binary input value '0' may begin with a low value and end with a high value. A Manchester cycle representing the binary input value '1' may begin with a high value and end with a low value. The order of the low and high values may vary according to the binary input value, but a transition in the middle of the cycle may typically be guaranteed. The Manchester encoding of a binary input is known to double the required communication bandwidth by splitting the binary signal into a high level and a low level. The binary signal may be recoverable by way of the order in which the high and low levels appear. However, in the case of MPPT, a high and a low signal may not be deleterious and may actually be useful for measurements. By using a Manchester-encoded probe waveform with a random bit as its binary input, high and low MPPT measurements may be made at the same frequency as with the more common square-wave probe waveforms. However, the high and low perturbations introduced by optimizers to other optimizers in the system when the probing optimizers are sensing the result of their MPPT probes may be scrambled. The unintentionally added artifacts from other MPPT probe signals in the system may therefore be statistically nullified. With the addition of sufficient multiple-cycle averaging, a system of many PV optimizers may safely execute MPPT without mutual interference.

Accordingly, a PV optimizer (power converter) may be configured to separate its MPPT probe signal from external noise sources. This may be especially relevant when the PV optimizer is part of a system of PV optimizers within a PV array. In such embodiments, the major source of noise as seen by an optimizer module input may be the MPPT activity of other optimizer modules within the array.

Noise may be reduced in a couple of steps. First, the probe signal used in performing the MPPT may use Manchester encoding to create a waveform with high and low levels suitable for MPPT, the order of these high and low levels being determined by a binary input value. Second, each probe waveform may be generated through a pseudo-random code generator. In one set of embodiments, the pseudo-random bit sequence (PRBS) generated by the pseudo-random code generator for a given optimizer may be derived from a unique serial ID of the optimizer.

Figure 9:
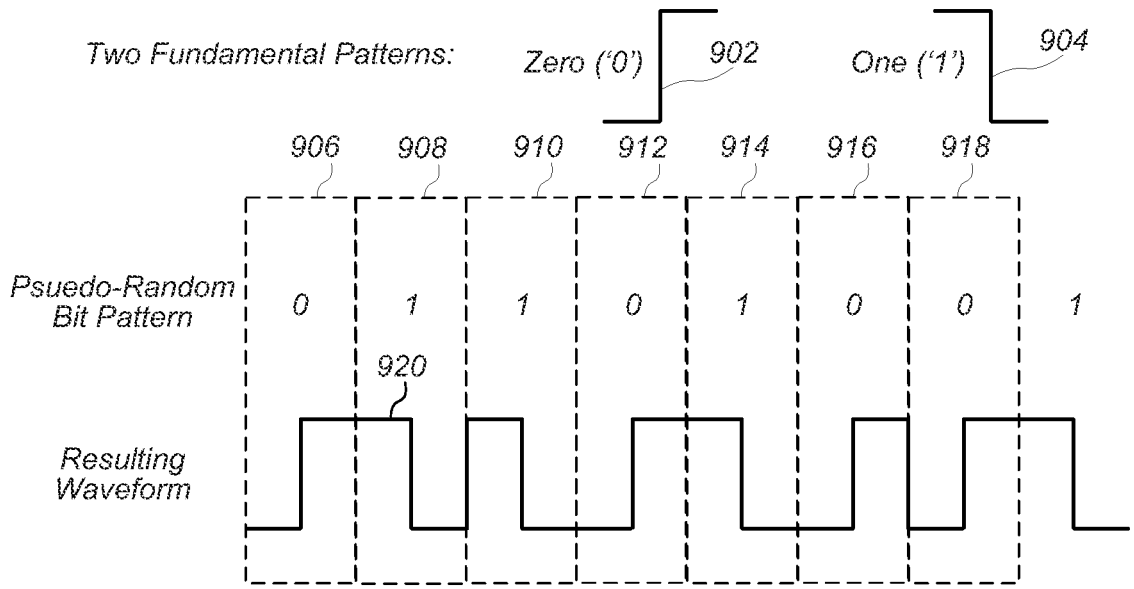
FIG. 9 shows a diagram illustrating one embodiment of a pseudo-random Manchester encoded waveform used for performing MPPT.

FIG. 9 shows a diagram illustrating one example of a pseudo-random Manchester encoded waveform that may be used for performing MPPT. As seen in FIG. 9, two fundamental waveform patterns 902 and 904 may be represented by bits '0' and '1', respectively. Thus, a pseudo-random sequence of bits 906-918 may yield overall waveform 920, which may be used in performing MPPT. It should be noted that the fundamental patterns may be slightly different than those shown, with each fundamental pattern including at least one transition. Furthermore, pattern 902 may be assigned to '1' while pattern 904 may be assigned to '0'. For embodiments described herein, the two fundamental patterns shown in FIG. 9 are used, with each respective fundamental pattern associated with a respective one of bits '0' and '1' as shown in FIG. 9, again noting that pattern 902 may be associated with '1' and pattern 904 may be associated with '0'.

FIG. 10 shows one embodiment of an algorithm (using pseudo-code) for generating a Manchester encoded waveform, for example the waveform shown in FIG. 9, with random patterns and built in MPPT. As indicated in FIG. 9, a Boolean variable "PositiveWave" may be used to indicate whether the pseudo-random bit is a '1' or a '0'. The pseudo-random bit generation is performed by function "PseudoRandomBit" in FIG. 10. If the indication is that the bit returned by "PseudoRandomBit" is a '1', then a first half of the probe cycle may include measuring a first output power ('Phi') of the power converter (on the DC voltage bus) at a first value of the input voltage representative of a present input voltage value, and a second half of the probe cycle may include measuring a second output power ('Plo') of the power converter at a second value of the input voltage representative of a target input voltage value. As seen, in these cases the target input voltage value is Vmpp (also labeled 'steady-state source voltage'), and the present input voltage value includes the added voltage from the amplitude of the probe waveform (Vprobe), for a first value of the input voltage that is equal to Vmpp+Vprobe. If the indication is that the bit returned by "PseudoRandomBit" is a '0', then the first half of the probe cycle may include first measuring the second output power ('Plo') of the power converter (on the DC voltage bus) at the second value of the input voltage representative of the target input voltage value, and the second half of the probe cycle may include measuring the first output power ('Phi') of the power converter at the first value of the input voltage representative of the present input voltage value.

As also seen in FIG. 10, a differential power may be used as the basis for making a determination whether to change the target input voltage value, and in what direction. Accordingly, if the measured first output power is greater than the measured second output power (i.e. Phi−Plo>0), then the target input voltage value is increased by a specified amount. Otherwise, that is if the measured first output power is not greater than the measured second output power (i.e. if Plo is greater than or equal to Phi), the target input voltage value may be decreases by the specified amount. Consequently, the source voltage may be changed to the new target input voltage value.

Options for Various Embodiments

Figure 11:
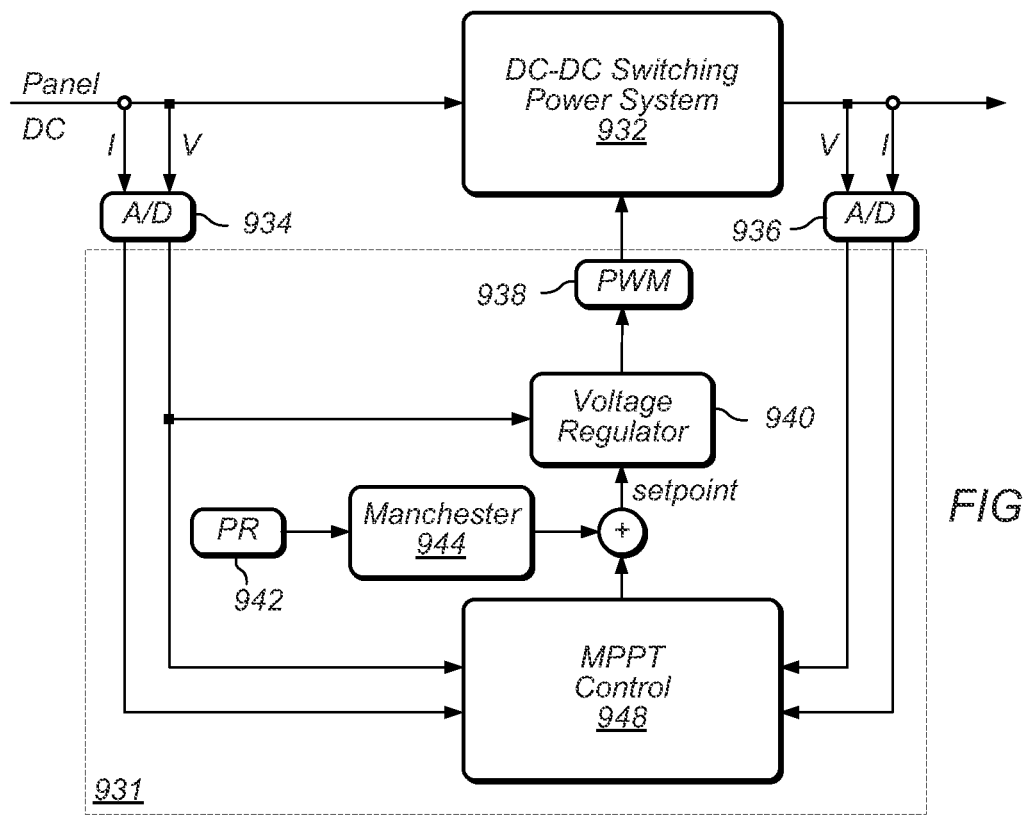
FIG. 11 shows the partial block diagram of one embodiment of a power converter implementing MPPT using a pseudo-random Manchester encoded waveform.

FIG. 11 shows the partial block diagram of one embodiment of a power converter implementing MPPT using a pseudo random Manchester encoded waveform. It should be noted, that other encoding methods may be used to generate the probe waveform based on the PRBS. Overall, any one of several DC-balancing methods may be applicable as recoding sequences. Manchester encoding may be one preferred DC-balancing method due to the simplicity of the implementation, and 'fast' bit-pair based DC restoration. In this case, the Manchester-encoded PRBS (Pseudo-Random Bit Sequence) probe signal from block 944 may be used to modulate an input-voltage regulation setpoint from the MPPT controller 948. A Pseudo-Random bit sequence generation block may provide the input to the probe signal generation block 944, which may generate the probe signal according to the received bit sequence (for example according to the mapping shown in FIG. 9). The voltage regulator 940 may linearize the input voltage response of the PWM controller 938, resulting in a more consistent power response of the MPPT controller 948 over the controller's operating range. The voltage regulator 940 may ideally have a wider control bandwidth than the MPPT controller 948. Step changes in the MPPT setpoint may typically be slow relative to the Manchester toggle rate. The voltage regulator 940, in turn, may update the PWM parameters faster than the Manchester toggle rate. As shown in FIG. 11, ADCs 934 and 936 may be used to obtain digitized values representative of the DC-DC switching power system 932 input current and voltage, and output current and voltage, respectively.

Figure 12:
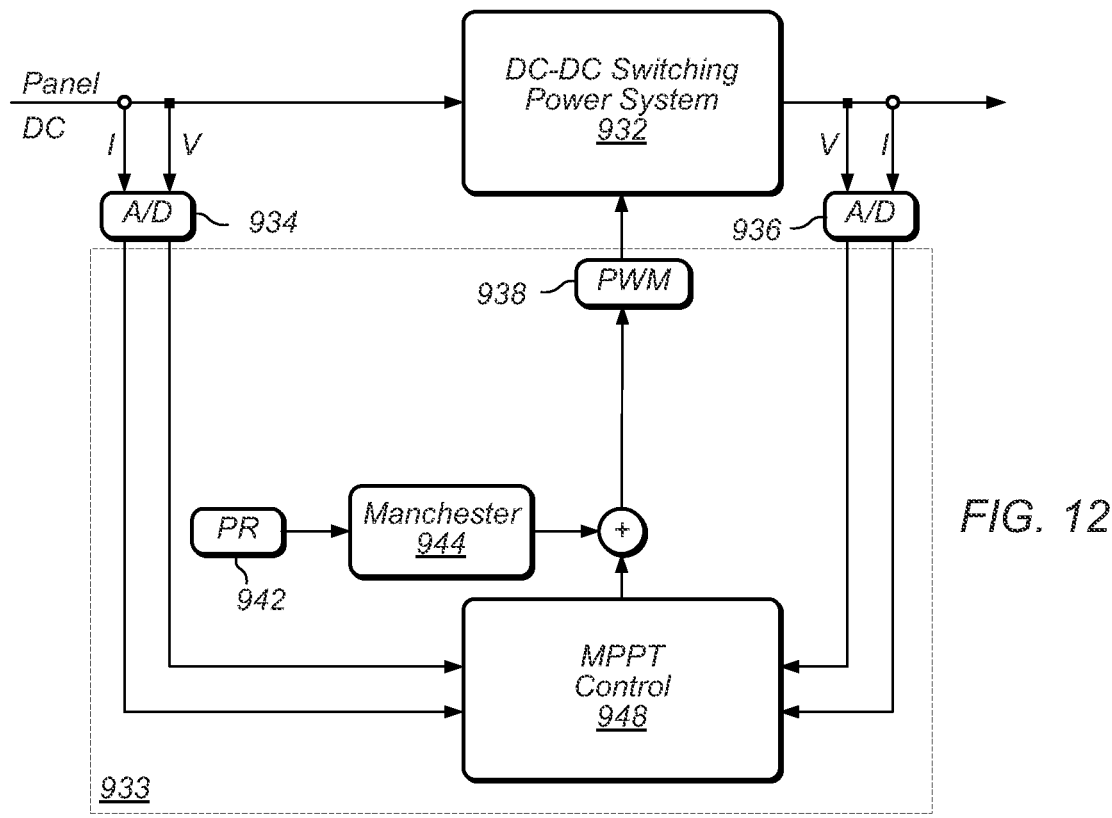
FIG. 12 shows the partial block diagram of an alternative embodiment of a power converter implementing MPPT using a pseudo-random Manchester encoded waveform.

Each of the control blocks shown in FIG. 11 may operate largely independently of the other blocks. For example, the Manchester encoder 944 may generate many bit pairs for each step change in the MPPT Control setpoint. More Manchester pairs may potentially improve measurement accuracy without affecting the spectral spreading provided by Manchester encoding. Alternatively, the control system may operate without a voltage regulator 940, as shown in FIG. 12, which shows the partial block diagram of an alternative embodiment of a power converter implementing MPPT using a pseudo-random Manchester encoded waveform. In this case, the MPPT control block 948 may control the PWM encoder 938 directly.

Key Advantages of Using PRBS Generation Over 'Perturb & Observe' MPPT Algorithms A common MPPT algorithm is 'Perturb and Observe' (P&O), in which the MPPT controller makes a small step change in current and/or voltage of the input operating point of the DC-DC power controller. If the MPPT controller detects that the change improves the power production, the MPPT controller may keep that change. If the power production gets worse, the MPPT controller may try making a step change in the opposite direction. One disadvantage of the P&O algorithm is that the probe operation and the control steps are the same. In contrast, the PRBS (e.g. a Manchester-encoded) probe signal is distinct from the control steps. Separating these two functions is advantageous, since the preferred probe signal rate and amplitude are likely determined by noise and measurement-accuracy considerations, whereas the control step-size and rate are determined by tracking misadjustments, slew-rate, and system-bandwidth considerations. Correlated probe and control steps may also have detrimental effect on control. In scenarios where the MPPT controller is actively slewing the operating point, the probe steps are likely predictable and periodic. Predictable and periodic probe steps are undesirable because of the capacity of producing periodic EMI noise. In addition, predictable and periodic probe steps can be correlated between optimizer modules in an array, causing MPPT control errors in the modules.

Key Advantages of Using PRBS Generation Over 'Dithered Perturb & Observe' MPPT Algorithms One conventional technique for separating the probe and control operations when using a P&O algorithm is to step the power up and down, but relative to a common reference power level. The reference power level may be adjusted by the controller in response made to the measurements made by the probe signal. Conventionally, the probe signal may be generated as a square wave, which means that the probe is periodic, and thus highly correlated between modules in a particular array.

Another disadvantage of this approach is that the peak-to-peak variation of the probe signal may be twice as large as in the case of a conventional P&O algorithm. Therefore, the average displacement from that true MPP may be twice as large, and consequently the efficiency loss due to MPPT may also be twice as large. Note that with Manchester encoding, the separation of the probe and control signals may be provided without increasing the probe amplitude. Note also that since the effective amplitude of the probe signal is larger, the EMI egress may likely be higher as well.

It may be possible to use a PRBS generator to create the probe bit stream for dithered P&O. However, this approach may still be less ideal when contrasted with Manchester encoding, since a PRBS bit stream is not naturally run-length limited. As a result, the low frequency and DC behavior of the resulting signal may not be as well controlled as it can be with a Manchester-encoded bit stream. For example, when using Manchester coding, probe pulses come in pairs of opposite signs. Thus, each probe pair is by itself DC balanced, providing an advantage over using PRBS directly.

Another disadvantage to dithered P&O is that its power spectrum may be broader than the power spectrum associated with Manchester-encoded probing. The broader spectrum pushes the generated EMI out to higher frequencies, and requires faster control hardware for controlling the same given bandwidth. Since the Manchester-encoded signal is generated from probe pairs, there may always be an up and down probe in every probe interval. In addition, the spectrum may be more tightly controlled than it is with a signal that is not as tightly run-length limited. This provides an advantage in validating and confirming system performance.

Embodiments of PRBS Generation

As mentioned above, the MPPT probe signals may be generated using a PRBS (Pseudo-Random Bit Sequence) generator. The exact bit sequence generated by the PRBS may not be important. One key attribute of the PRBS generator is the probability of any one generated bit being independent of the preceding bits, at least over a time period during which the PV array may have a significant response. For example, if the voltage impulse response of the DC voltage bus connecting an array of DC-DC modules to an inverter decays to a negligible level after 10 ms, and the MPPT bit-time is 20 µs, the PRBS generator may be used to generate a sequence that minimizes bit correlation for at least 500 MPPT bit-times.

This objective may be readily met through the use of a primitive-polynomial bit generator. The periodicity of the bit sequence for a particular bit generator may be determined by the number of bits in the primitive polynomial. To provide a bit-sequence periodicity of at least 500, a polynomial of at least length 9 ($2^9$=512) may be used. Thus, for this example, a 16-bit microcontroller may provide an exemplary execution platform. Such a microcontroller may have unsigned bit-manipulation instructions that make implementing a 15-bit primitive polynomial—which would be far longer than needed in most practical applications, providing a very straightforward implementation overall. Thus, in one set of embodiments, PR block 942 may be implemented using a 16-bit microcontroller. However, it should be evident to one of ordinary skill in the art that many hardware and/or software (or combination of both) implementations are possible within the framework of the converters shown in FIGS. 11 and 12.

PRBS Seed

If all of the modules in a string use the same polynomial, and their PRBS generators are synchronized in time, then the decorrelation value provided by a PRBS may be lost. Thus, the various embodiments of MPPT algorithms that use a Manchester encoded PRBS may be configured to assure that the bit sequences on the modules are highly decorrelated in time. However, if the bit sequences are synchronized, the interference between modules may be increased. Modules in a string may be likely to start operation at significantly different times, depending on the power status of their associated PV panels. As a result, modules may naturally generate PRBS sequences that are not well synchronized, and thus are poorly correlated.

However, to minimize the correlation between PRBS sequences on different modules, more effort to decorrelate PRBS sequences may be useful. One possible approach may be to use different PRBS seeds on different modules in an array. Thus, one possible source of PRBS seeds may be a module serial ID. A unique serial ID for each module, (e.g. the digital serial ID readable by the microcontroller) may be used to seed the PRBS generator. For example, on Zigbee wireless connected modules, the Zigbee serial ID (or at least the last 16 bits of the Zigbee serial ID) may be used as a PRBS seed.

To further scramble the PRBS sequences, different generator polynomials may be used on different modules. There are 2048 different primitive polynomials known for 15-bit PRBS generators, allowing for an additional 11 bits ($2^{11}$=2048) of differentiating means for PRBS bit sequences. For example, for a 32-bit Zigbee serial ID, 26 of those bits may be used to keep the PRBS sequences on different modules decorrelated. The PRBS may also be uncorrelated with any other noise source in the system (e.g., inverter noise), and may be further uncorrelated with power slewing caused, for example, by cloud shadows drifting across the PV array. Correlation with power slewing is a known frailty of perturb-and-observe MPPT, in particular.

Alternative Embodiment of a PRBS Generator

Other means for generating PRBS sequences are possible, and are contemplated. For example, a broadband thermal noise generator may be connected to an ADC channel, and the microcontroller may 'slice' the noise to generate a pseudo-random sequence. Advantages to this approach include algorithmic simplicity, and a lack of periodicity. One likely disadvantage is the lack of certainty/predictability in the behavior of such a PRBS generator, which may be important for validating the system-level behavior of the system. However, Manchester encoding naturally removes the DC content of the encoded signal, so run-length issues in the PRBS generator are not likely to pose a serious problem in this case.

Numerous variations and modifications will become apparent to those skilled in the art once the above disclosure is fully appreciated. Note the section headings used herein are for organizational purposes only, and are not meant to limit the descriptions provided herein. Numerical values throughout have been provided as examples, and are not meant to limit the descriptions provided herein.

We claim:

1. A control module for controlling a power converter configured to couple to a solar panel to provide an output voltage and an output current to a bus, the control module comprising:
a plurality of input ports, each given input port of the plurality of input ports configured to receive a different one of a plurality of parameters comprising:
a first parameter indicative of an input current of the power converter provided by the solar panel;
a second parameter indicative of an input voltage of the power converter provided by the solar panel;
a third parameter indicative of an output voltage of the power converter; and
a fourth parameter indicative of an output current of the power converter; and
a controller configured to implement a maximum power point tracking (MPPT) algorithm to regulate the input voltage and the input current of the power converter according to the first, second, third, and fourth parameters;
wherein in implementing the MPPT algorithm, the controller is configured to generate a probe waveform based on a pseudo-random bit sequence (PRBS) input, and use the probe waveform to probe an overall voltage on the bus.

2. The control module of claim 1, wherein the probe waveform is a seamless succession of a plurality of at least two distinct fundamental wave patterns.

3. The control module of claim 2;
wherein a first fundamental wave pattern of the at least two distinct fundamental wave patterns represents one of binary input values '0' and '1', and begins with a low value and ends with a high value; and
wherein a second fundamental wave pattern of the at least two distinct fundamental wave patterns represents the other binary input value of the binary input values '0' and '1', and begins with a high value and ends with a low value.

4. The control module of claim 3, wherein the first fundamental wave pattern represents the binary input value '0', and the second fundamental wave pattern represents the binary input value '1'.

5. The control module of claim 1, wherein the controller is configured to generate the probe waveform as a Manchester-encoded waveform from the PRBS input.

6. The control module of claim 1, wherein the controller is configured to derive the PRBS from a unique identification code corresponding to the control module.

7. The control module of claim 1, wherein the controller is configured to generate the PRBS input from a unique seed different from similar seeds used by other similar control modules used for controlling other similar power converters coupled to other respective solar panels to provide a respective output voltage and a respective output current to the bus.

8. A control system for controlling a power converter configured to couple to a solar panel to provide an output voltage and output current to a voltage bus residing at an overall bus voltage, the control system comprising:
a sensing circuit configured to sense input current and input voltage of the power converter derived from the solar panel, and further configured to sense the output voltage and the output current of the power converter; and
a controller configured to regulate the input voltage of the power converter according to:
the sensed input current of the power converter;
the sensed input voltage of the power converter;
the sensed output voltage of the power converter;
the sensed output current of the power converter; and
a target input voltage value;
wherein the controller is configured to determine the target input voltage value by probing the overall bus voltage using a probe waveform derived from a pseudo-random bit sequence (PRBS).

9. The control system of claim 8, wherein the controller is configured to generate the probe waveform from two distinct fundamental wave patterns according to the PRBS.

10. The control system of claim 9;
wherein a first fundamental wave pattern of the two distinct fundamental wave patterns represents one of binary input values '0' and '1', and begins with a low value and ends with a high value; and
wherein a second fundamental wave pattern of the two distinct fundamental wave patterns represents the other binary input value of the binary input values '0' and '1', and begins with a high value and ends with a low value.

11. The control module of claim 10, wherein the first fundamental wave pattern represents the binary input value '0', and the second fundamental wave pattern represents the binary input value '1'.

12. The control module of claim 8, wherein the controller is configured to derive the PRBS from a unique identification code corresponding to the control system and the power converter.

13. The control module of claim 8, wherein the controller is configured to generate the PRBS from a unique seed different from similar seeds used by other similar control systems used for controlling other similar power converters coupled to other respective solar panels to provide a respective output voltage and a respective output current to the voltage bus.

14. The control system of claim 8, wherein in probing the overall bus voltage, the controller is configured to perform the following for each bit of the PRBS:
if the bit has a first bit value:
during a first half of a probe cycle of the probe waveform, obtain a value of a first output power of the power converter at a first value of the input voltage representative of the target input voltage value augmented by an amplitude of the probe waveform; and
during the second half of the probe cycle, obtain a value of a second output power of the power converter at a second value of the input voltage representative of the target input voltage value; and
if the bit has a second bit value:
during the first half of the probe cycle, obtain the value of the second output power at the second value of the input voltage; and
during the second half of the probe cycle, obtain the value of the first output power at the first value of the input voltage.

15. The control system of claim 14, wherein the first bit value is '1', and the second bit value is '0'.

16. The control system of claim 14, wherein the controller is further configured to adjust the target input voltage value according to the value of the first output power and the value of the second output power, and adjust the input voltage of the power converter according to the adjusted target input voltage value.

17. The control system of claim 14, wherein the controller is further configured to:
increase the target input voltage value by a specified amount and adjust the input voltage of the power converter to the increased target input voltage value if the value of the first output power is greater than the value of the second output power; and
decrease the target input voltage value by a specified amount and adjust the input voltage of the power converter to the decreased target input voltage value if the value of the second output power is greater than the value of the first output power.

18. A method for controlling a power converter coupled to a solar panel to provide an output voltage and an output current to a voltage bus, the method comprising:
monitoring input voltage and input current of the power converter;
monitoring the output voltage and the output current of the power converter;
regulating the input voltage of the power converter according to a Maximum Power Point Tracking (MPPT) algorithm using parameters corresponding to:
the monitored input voltage and monitored input current of the power converter; and
the monitored output voltage and output current of the power converter;
wherein said regulating the input voltage of the power converter according to an MPPT comprises:
deriving and generating a probe waveform from a pseudo-random bit sequence (PRBS); and
probing an overall bus voltage of the voltage bus using the probe waveform.

19. The method of claim 18, wherein said regulating the input voltage of the power converter according to an MPPT further comprises:
generating the PRBS from a unique seed value corresponding to the power converter.

20. The method of claim 18, wherein said regulating the input voltage of the power converter according to an MPPT further comprises:
generating the PRBS using a primitive-polynomial bit generator, wherein a periodicity of the PRBS is determined by a number of bits in a primitive polynomial of the primitive-polynomial bit generator.

21. The method of claim 18, wherein said probing the overall bus voltage comprises:
for each bit of the PRBS:
if the bit has a first bit value:
during a first half of a probe cycle of the probe waveform, obtaining a value of a first output power of the power converter for a first value of the input voltage representative of a target value augmented by an amplitude of the probe waveform; and
during the second half of the probe cycle, obtaining a value of a second output power of the power converter for a second value of the input voltage representative of the target value; and
if the bit has a second bit value:
during the first half of the probe cycle, obtaining the value of the second output power for the second value of the input voltage; and
during the second half of the probe cycle, obtaining the value of the first output power for the first value of the input voltage.

22. The method of claim 21, wherein the first bit value is '1', and the second bit value is '0'.

23. The method of claim 21, wherein said regulating the input voltage of the power converter according to an MPPT further comprises:
adjusting the target value according to the value of the first output power and the value of the second output power; and
adjusting the input voltage of the power converter according to the adjusted target value.

24. The method of claim 21, wherein said regulating the input voltage of the power converter according to an MPPT further comprises:
increasing the target value by a specified amount and regulating the input voltage of the power converter to the increased target value if the value of the first output power is greater than the value of the second output power; and decreasing the target value by a specified amount and regulating the input voltage of the power converter to the decreased target value if the value of the second output power is greater than the value of the first output power.

25. A converter unit comprising:
a power converter having an input configured to couple to a solar panel to obtain an input voltage and input current from the solar panel, and an output configured to couple to a voltage bus to provide a converter output voltage and a converter output current to the voltage bus; and
a control unit comprising:
one or more input ports, each given input port of the one or more input ports configured to receive one of a plurality of parameters comprising:
a first parameter indicative of an input current of the power converter;
a second parameter indicative of an input voltage of the power converter;
a third parameter indicative of the converter output voltage; and
a fourth parameter indicative of the converter output current;
wherein the control unit is configured to regulate the input voltage of the power converter according to a Maximum Power Point Tracking (MPPT) algorithm that uses the first, second, third, and fourth parameters as input values, and uses a probe waveform generated according to a pseudo-random bit sequence (PRBS) to probe an overall voltage on the voltage bus.

26. The converter unit of claim 25, wherein the probe waveform is a Manchester-encoded waveform based on the PRBS.

27. The converter of claim 25, wherein control unit is configured to generate a DC-balanced probe waveform based on the PRBS.

28. The converter unit of claim 25, wherein the control unit further comprises:
a pseudo-random sequence generator (PRSG) configured to generate the PRBS;
an encoding unit configured to receive the PRBS and generate the probe waveform based on the received PRBS; and
a modulating unit configured to generate a converter control signal according to at least the probe waveform, and provide the converter control signal to the power converter to regulate the input voltage of the power converter.

29. The converter unit of claim 28, wherein the control unit further comprises:
an MPPT controller configured to generate a feedback control signal based on the first, second, third, and fourth parameters;
wherein the modulating unit is configured to generate the converter control signal according to a combination of the feedback control signal and the probe waveform.

30. The converter unit of claim 28, wherein the modulating unit is configured to generate the probe waveform as a Manchester-encoded waveform.

31. The converter unit of claim 28, wherein the power converter is a switching power converter, and the converter control signal is a pulse-width-modulated signal.

32. A system for harnessing photonic energy to provide power to one or more loads, the system comprising: a plurality of solar power panels, wherein each given solar panel of the plurality of solar panels provides a respective output current and a respective output voltage; a DC voltage bus providing a DC bus voltage; a plurality of converter units coupled to the DC voltage bus, each converter unit of the plurality of converter units configured to provide a respective converter output voltage to the DC voltage bus, wherein each given solar panel is coupled to a corresponding converter unit of the plurality of converter units to provide its respective output current and its respective output voltage as inputs to its corresponding converter unit, wherein each corresponding converter unit comprises a switching power module that produces a respective converter output voltage and respective converter output current, and wherein each corresponding converter unit is configured to: regulate an input voltage of its switching power module according to an MPPT (maximum power point tracking) algorithm receiving parameters as inputs, and employ a probe waveform based on a respective pseudo-random bit sequence (PRBS) to probe the DC voltage bus, wherein the parameters correspond to: the input voltage and input current of the switching power module; and the respective converter output voltage, and the respective converter output current.

33. The system of claim 32, wherein the plurality of converter units are series connected to the DC voltage bus via their respective outputs.

34. The system of claim 32, wherein each corresponding converter unit is further configured to generate its respective PRBS based on a unique seed different from similar unique seeds of other ones of the plurality of converter units.

35. The system of claim 34, wherein each corresponding converter unit is further configured to derive its unique seed from identification information corresponding to the corresponding converter unit.

36. The system of claim 32, wherein each corresponding converter unit is further configured to generate its probe waveform as a Manchester-encoded waveform according to its respective PRBS.

* * * * *